(12) United States Patent
Kim et al.

(10) Patent No.: US 12,580,206 B2
(45) Date of Patent: Mar. 17, 2026

(54) SEPARATOR FOR FUEL CELL AND FUEL CELL STACK

(71) Applicants: HYUNDAI MOTOR COMPANY, Seoul (KR); Kia Corporation, Seoul (KR)

(72) Inventors: Bae Jung Kim, Yongin-si (KR); Hyun Jeong Kim, Yongin-si (KR); Ah Reum Kim, Yongin-si (KR); Young Chul Park, Yongin-si (KR); Hyun Kyu Choi, Yongin-si (KR); Chan Gi Kim, Yongin-si (KR); Sun Hwi Kim, Yongin-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 659 days.

(21) Appl. No.: 17/868,947

(22) Filed: Jul. 20, 2022

(65) Prior Publication Data

US 2023/0327142 A1 Oct. 12, 2023

(30) Foreign Application Priority Data

Apr. 12, 2022 (KR) ........................ 10-2022-0044957

(51) Int. Cl.
H01M 8/0258 (2016.01)
H01M 4/88 (2006.01)
H01M 8/0273 (2016.01)
H01M 8/1004 (2016.01)

(52) U.S. Cl.
CPC ....... *H01M 8/0258* (2013.01); *H01M 4/8807* (2013.01); *H01M 8/0273* (2013.01); *H01M 8/1004* (2013.01)

(58) Field of Classification Search
CPC ....... H01M 2008/1095; H01M 4/8807; H01M 8/0206; H01M 8/0258; H01M 8/0273;
(Continued)

(56) References Cited

U.S. PATENT DOCUMENTS

| | | | |
|---|---|---|---|
| 8,211,584 B2 | 7/2012 | Jeon et al. | |
| 10,411,273 B2 | 9/2019 | Ichihara et al. | |

(Continued)

FOREIGN PATENT DOCUMENTS

| | | | |
|---|---|---|---|
| EP | 2 573 851 A2 | 3/2013 | |
| JP | 2010-507212 A | 3/2010 | |

(Continued)

OTHER PUBLICATIONS

Machine translation JP2012248472A (Year: 2012).*

(Continued)

*Primary Examiner* — Victoria H Lynch
(74) *Attorney, Agent, or Firm* — MORGAN, LEWIS & BOCKIUS LLP

(57) ABSTRACT

A separator for a fuel cell, which is stacked on a gas diffusion layer provided on a membrane electrode assembly (MEA), includes a plate body stacked on the gas diffusion layer and including a flow path part to define a reaction region to react with the membrane electrode assembly and manifold parts spaced apart from the flow path part; through-holes disposed in the plate body to guide target fluids that have passed through the manifold parts to the flow path part; and hole caps disposed on one surface of the plate body that faces the gas diffusion layer to at least partially cover the through-holes, the hole caps defining movement paths through which the target fluids move.

12 Claims, 9 Drawing Sheets

(58) Field of Classification Search
CPC .. H01M 8/0276; H01M 8/1004; H01M 8/241; Y02E 60/50
See application file for complete search history.

(56) References Cited

U.S. PATENT DOCUMENTS

| 11,476,471 B2 | 10/2022 | Gambini |
|---|---|---|
| 2010/0028742 A1 | 2/2010 | Jeon et al. |
| 2019/0173102 A1 | 6/2019 | Ichihara et al. |
| 2019/0221866 A1 | 7/2019 | Gambini |

FOREIGN PATENT DOCUMENTS

| JP | 2012-248472 A | 12/2012 |
|---|---|---|
| JP | 2013-500569 A | 1/2013 |
| JP | 2019-106375 A | 6/2019 |
| KR | 10-2015-0124726 A | 11/2015 |
| KR | 10-2020-0106947 A | 9/2020 |
| WO | 2017/077634 A1 | 5/2017 |

OTHER PUBLICATIONS

Extended European search report issued on Dec. 7, 2023, in counterpart European Patent Application No. 22185409.4 (8 pages).
Office Action issued in corresponding Korean Patent Application 10-2022-0044967 on Oct. 16, 2024.
Notice of Allowance issued in corresponding Japanese Patent Application No. 2022-127613 dated Jan. 6, 2026, with English translation.

* cited by examiner

SEPARATOR FOR FUEL CELL AND FUEL CELL STACK

CROSS-REFERENCE TO RELATED APPLICATION

This application claims priority to and the benefit of Korean Patent Application No. 10-2022-0044957 filed in the Korean Intellectual Property Office on Apr. 12, 2022, the entire contents of which are incorporated herein by reference.

TECHNICAL FIELD

The present disclosure relates to a separator for a fuel cell and a fuel cell stack, and more particularly, to a separator for a fuel cell and a fuel cell stack, which are capable of improving performance and operational efficiency.

BACKGROUND ART

A fuel cell stack refers to a kind of power generation device that generates electrical energy through a chemical reaction of fuel (e.g., hydrogen), and the fuel cell stack may be configured by stacking several tens or hundreds of fuel cells (unit cells) in series.

The fuel cell may include a membrane electrode assembly (MEA) having an electrolyte membrane configured to allow hydrogen positive ions to move therethrough, and electrodes (catalyst electrode layers) provided on two opposite surfaces of the electrolyte membrane and configured to enable a reaction between hydrogen and oxygen. The fuel cell may also include gas diffusion layers (GDLs) disposed to be in close contact with two opposite surfaces of the membrane electrode assembly and configured to distribute reactant gases and transfer the generated electrical energy, and separators (bipolar plates) disposed to be in close contact with the gas diffusion layers and configured to define flow paths.

The separators may include an anode separator configured to supply hydrogen which is fuel, and a cathode separator configured to supply air which is an oxidant. The separator includes channels through which the fuel or the oxidant flows.

In addition, in order to configure the fuel cell stack by stacking the fuel cells, sealability needs to be maintained between the membrane electrode assembly and reaction surfaces of the separators and between cooling surfaces of the separators.

To this end, gaskets are disposed between the membrane electrode assembly and the reaction surfaces of the separators and the cooling surfaces of the separators. That is, the gaskets serve to prevent the reactant gases (e.g., hydrogen and air) flowing to the reaction surfaces of the separators from leaking to the outside of the fuel cell stack and to prevent the coolant flowing to the cooling surfaces of the separators from leaking to the outside of the fuel cell stack.

The gaskets may be integrated, by injection molding, with edge portions of two opposite surfaces of the separator and with edge portions of two opposite sides of each manifold for allowing the reactant gases and the coolant to flow in and out. The flow paths for the reactant gases and the coolant may be defined by the gaskets.

Meanwhile, sufficient fastening pressure needs to be applied to the plurality of fuel cells having the gaskets therebetween in order to ensure sealability at the time of stacking the fuel cells.

However, in the related art, there is a problem in that the gaskets provided on the two opposite surfaces of the separator are deformed (excessively compressed) when the fastening pressure (pressing force) is applied to the fuel cells. In particular, a portion of the gasket, which is disposed around a through-hole for guiding the reactant gas (or the coolant) introduced through the manifold flow path to a reaction region on the separator, is excessively compressed, which makes it difficult to ensure a sufficient flow path (cross-sectional area of the flow path) for the reactant gas or the coolant. For this reason, it is difficult to smoothly supply the reactant gas or the coolant to the reaction region on the separator (a channel between an inlet manifold and an outlet manifold).

Moreover, in the related art, as the entire through-hole of the separator is covered by the gas diffusion layer (the gas diffusion layer is inserted into the through-hole to block the through-hole), the reactant gas introduced into the through-hole needs to flow to the reaction region while inevitably passing through the compressed gas diffusion layer. For this reason, there are problems in that fluidity and flow efficiency of the reactant gas (or the coolant) passing through the through-hole deteriorate, and a differential pressure between the two opposite ends (an inlet end and an outlet end) of the manifold flow path increases.

Therefore, recently, various studies have been conducted to minimize the differential pressure while ensuring the smooth flows of the reactant gases and the smooth flow of the coolant, but the study results are still insufficient. Accordingly, there is a need to develop a technology to minimize the differential pressure while ensuring the smooth flows of the reactant gases and the smooth flow of the coolant.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

The present disclosure has been made in an effort to provide a separator for a fuel cell and a fuel cell stack, which are capable of ensuring smooth flows of reactant gases and a smooth flow of a coolant and improving safety and reliability.

The present disclosure has also been made in an effort to improve flow efficiency and enable reactant gases and a coolant to stably flow through through-holes for guiding the reactant gases and the coolant introduced through manifold flow paths of a separator to a reaction region.

The present disclosure has also been made in an effort to inhibit a sealing member from being excessively compressed (being deformed) and stably ensure flow path areas through which reactant gases and a coolant having passed through through-holes flow.

The present disclosure has also been made in an effort to ensure sealability (fastening performance) between fuel cells while ensuring flows of reactant gases and a flow of a coolant.

The present disclosure has also been made in an effort to simplify a structure and a manufacturing process and reduce manufacturing costs.

The present disclosure has also been made in an effort to minimize a distribution deviation (flow rate deviation) of a reactant gas or a coolant and ensure stable output performance.

The objects to be achieved by the embodiments are not limited to the above-mentioned objects, but also include objects or effects that may be understood from the solutions or embodiments described below.

In one general aspect, a separator for a fuel cell, which is configured to be stacked on a gas diffusion layer provided on a membrane electrode assembly (MEA), includes: a plate body configured to be stacked on the gas diffusion layer and including a flow path part configured to define a reaction region configured to react with the membrane electrode assembly, and manifold parts spaced apart from the flow path part; through-holes disposed in the plate body and configured to guide target fluids that have passed through the manifold parts to the flow path part; and hole caps disposed on one surface of the plate body that faces the gas diffusion layer and configured to at least partially cover the through-holes, the hole caps being configured to define movement paths through which the target fluids move.

This is to ensure smooth flows of reactant gases and a smooth flow of a coolant and improve safety and reliability.

That is, in the related art, gaskets provided on two opposite surfaces of a separator are deformed (excessively compressed) when fastening pressure (pressing force) is applied to a fuel cell. In particular, a portion of the gasket (sealing member), which is disposed around a through-hole for guiding the reactant gas (or the coolant) introduced through the manifold flow path to a reaction region on the separator, is excessively compressed, which makes it difficult to ensure a sufficient flow path (cross-sectional area of the flow path) for the reactant gas or the coolant. For this reason, it is difficult to smoothly supply the reactant gas or the coolant to the reaction region on the separator (a channel between an inlet manifold and an outlet manifold).

Moreover, in the related art, as the entire through-hole of the separator is covered by the gas diffusion layer (the gas diffusion layer is inserted into the through-hole to block the through-hole), the reactant gas introduced into the through-hole needs to flow to the reaction region while inevitably passing through the compressed gas diffusion layer. For this reason, there are problems in that fluidity and flow efficiency of the reactant gas (or the coolant) passing through the through-hole deteriorate, and a differential pressure between the two opposite ends (an inlet end and an outlet end) of the manifold flow path increases.

However, according to the embodiment of the present disclosure, the hole cap may be disposed to cover the through-hole, and the hole cap may define the movement path which is not blocked by the gas diffusion layer. Therefore, it is possible to ensure the fluidity and flow efficiency of the reactant gas (or coolant) passing through the through-hole and ensure stable output performance of the fuel cell stack.

Moreover, according to the embodiment of the present disclosure, the hole cap may support the gas diffusion layer, such that it is possible to inhibit the portion of the sealing member, which is disposed around the through-hole, from being excessively compressed. Therefore, it is possible to obtain an advantageous effect of ensuring sealability (fastening performance) of the fuel cell and ensuring sufficient flow paths (flow path cross-sectional areas) for the reactant gases and the coolant.

According to the exemplary embodiment of the present disclosure, the separator for a fuel cell may include a sealing member provided on the plate body and configured to seal a portion between the adjacent through-holes, the sealing member being configured to define a distribution channel configured to connect the flow path part and the through-hole so that the flow path part and the through-hole communicate with each other, in which the hole cap is positioned in the distribution channel.

The hole cap may have various structures having the movement path.

According to the exemplary embodiment of the present disclosure, the hole cap may include: a side cap portion provided on an edge of the through-hole; and a top cap portion spaced apart from the plate body, configured to cover the through-hole, and supported by the side cap portion, and the movement path may be defined in a space between the top cap portion and the plate body.

According to the exemplary embodiment of the present disclosure, the movement path may be defined to be parallel to the plate body.

According to the exemplary embodiment of the present disclosure, the hole cap may be integrated with the plate body by partially processing a part of the plate body.

As described above, according to the embodiment of the present disclosure, the hole cap may be formed at the time of forming separator (during the process of forming the flow path). Therefore, it is possible to obtain an advantageous effect of simplifying the structure and manufacturing process and reducing the costs.

According to the exemplary embodiment of the present disclosure, the separator for a fuel cell may include a side hole penetratively formed in a wall surface of the side cap portion.

As described above, according to the embodiment of the present disclosure, the side hole may be provided in the side cap portion. Therefore, it is possible to obtain an advantageous effect of ensuring a smoother flow of the target fluid passing through the through-hole and reducing the occurrence of differential pressure in the through-hole.

According to the exemplary embodiment of the present disclosure, the separator for a fuel cell may include a reinforcing part configured to support the hole cap on the plate body.

The reinforcing part may have various structures capable of supporting the hole cap on the plate body.

According to the exemplary embodiment of the present disclosure, the reinforcing part may be disposed in the through-hole.

According to the exemplary embodiment of the present disclosure, the reinforcing part may include: a center reinforcing member connected to an inner surface of the top cap portion; a first side reinforcing member having one end connected to one side surface of the center reinforcing member and the other end connected to the plate body; and a second side reinforcing member having one end connected to the other side surface of the center reinforcing member and the other end connected to the plate body.

In particular, the first side reinforcing member may be provided in plural, the plurality of first side reinforcing members may be spaced apart from one another in a longitudinal direction of the center reinforcing member, the second side reinforcing member may be provided in plural, and the plurality of second side reinforcing members may be spaced apart from one another in the longitudinal direction of the center reinforcing member. As described above, according to the embodiment of the present disclosure, the plurality of first side reinforcing members and the plurality of second side reinforcing members may be spaced apart from one another in the longitudinal direction of the center reinforcing member. Therefore, it is possible to ensure a smooth flow of the target fluid while more stably supporting the center reinforcing member.

According to the exemplary embodiment of the present disclosure, the separator for a fuel cell may include a center hole provided in the center reinforcing member and formed through one side surface and the other side surface of the center reinforcing member.

As described above, according to the embodiment of the present disclosure, the center hole may be provided in the center reinforcing member. Therefore, it is possible to obtain an advantageous effect of minimizing a decrease in flow of the target fluid caused by the center reinforcing member provided in the hole cap.

In another general aspect, a fuel cell stack includes: a membrane electrode assembly (MEA); a gas diffusion layer stacked on the membrane electrode assembly; and a separator including: a plate body configured to be stacked on the gas diffusion layer and including a flow path part configured to define a reaction region configured to react with the membrane electrode assembly, and manifold parts spaced apart from the flow path part; through-holes disposed in the plate body and configured to guide target fluids that have passed through the manifold parts to the reaction region; and hole caps disposed on one surface of the plate body that faces the gas diffusion layer and configured to at least partially cover the through-holes, the hole caps being configured to define movement paths through which the target fluids move.

According to the exemplary embodiment of the present disclosure, the hole cap may include: a side cap portion provided on an edge of the through-hole; and a top cap portion spaced apart from the plate body, configured to cover the through-hole, and supported by the side cap portion, and the movement path may be defined in a space between the top cap portion and the plate body.

According to the exemplary embodiment of the present disclosure, the fuel cell stack may include a side hole penetratively formed in a wall surface of the side cap portion.

According to the exemplary embodiment of the present disclosure, the fuel cell stack may include a reinforcing part configured to support the hole cap on the plate body.

According to the exemplary embodiment of the present disclosure, the reinforcing part may include: a center reinforcing member connected to an inner surface of the top cap portion; a first side reinforcing member having one end connected to one side surface of the center reinforcing member and the other end connected to the plate body; and a second side reinforcing member having one end connected to the other side surface of the center reinforcing member and the other end connected to the plate body.

According to the exemplary embodiment of the present disclosure, the fuel cell stack may include a center hole provided in the center reinforcing member and formed through one side surface and the other side surface of the center reinforcing member.

According to the exemplary embodiment of the present disclosure, the fuel cell stack may include a sealing member provided on the plate body and configured to seal a portion between the adjacent through-holes, the sealing member being configured to define a distribution channel configured to connect the flow path part and the through-hole so that the flow path part and the through-hole communicate with each other, in which the hole cap is positioned in the distribution channel.

According to the exemplary embodiment of the present disclosure, the hole cap may be integrated with the plate body by partially processing a part of the plate body.

Other features and aspects will be apparent from the following detailed description, the drawings, and the claims.

DETAILED DESCRIPTION

Figure 1:
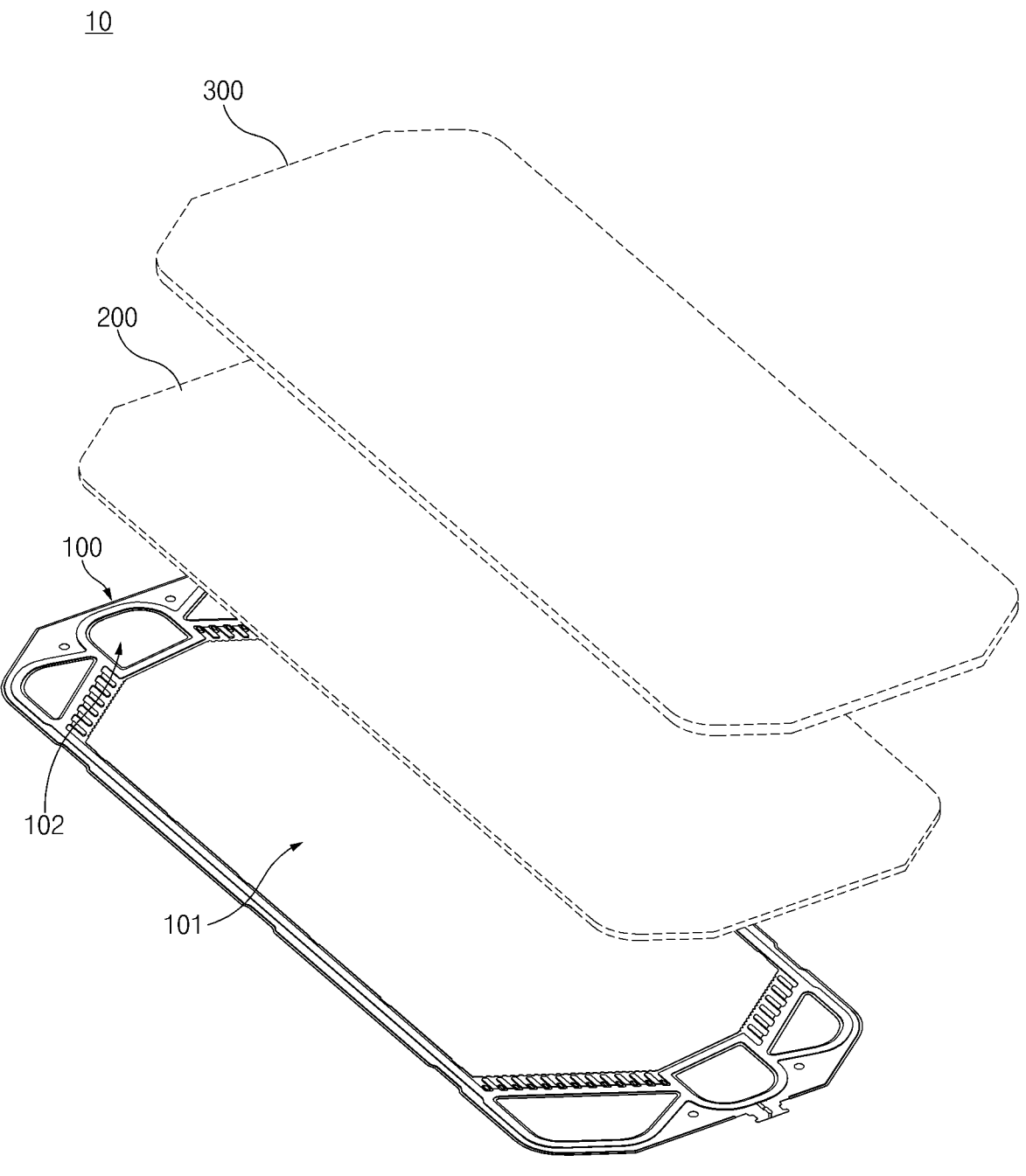
FIG. 1 is a view for explaining a fuel cell stack according to an embodiment of the present disclosure.

Hereinafter, exemplary embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 9, a fuel cell stack 10 according to an embodiment of the present disclosure includes: a membrane electrode assembly (MEA) 300; a gas diffusion layer 200 stacked on the membrane electrode assembly 300; and a separator 100 including: a plate body 110 stacked on the gas diffusion layer 200 and including a flow path part 101 configured to define a reaction region configured to react with the membrane electrode assembly 300, and manifold parts 102 spaced apart from the flow path part 101; through-holes 112 formed in the plate body 110 and configured to guide target fluids (e.g., reactant gases and a coolant) having passed through the manifold parts 102 to the reaction region; and hole caps 120 disposed on one surface of the plate body 110 facing the gas diffusion layer 200 and configured to at least partially cover the through-holes 112, the hole caps 120 being configured to define movement paths 120a through which the target fluids move.

For reference, the fuel cell stack 10 may be configured by stacking a plurality of unit cells in a reference direction (e.g., an upward/downward direction).

The fuel cell (unit cell) may include a reaction layer (not illustrated), and the separators 100 stacked on two respective opposite sides of the reaction layer. The fuel cell stack 10 may be configured by stacking the plurality of fuel cells in the reference direction and then assembling end plates (not illustrated) to the two opposite ends of the plurality of fuel cells.

More specifically, the reaction layer may include the membrane electrode assembly (MEA) 300, and the gas diffusion layers (GDL) 200 being in close contact with two opposite sides of the membrane electrode assembly 300.

The membrane electrode assembly 300 serves to generate electricity by means of an oxidation-reduction reaction between fuel (e.g., hydrogen), which is a first reactant gas, and an oxidant (e.g., air) which is a second reactant gas.

The membrane electrode assembly 300 may be variously changed in structure and material in accordance with required conditions and design specifications, and the present disclosure is not limited or restricted by the structure and material of the membrane electrode assembly 300.

For example, the membrane electrode assembly 300 includes the electrolyte membrane through which hydrogen ions move, and the catalyst electrode layers attached to two opposite surfaces of the electrolyte membrane, and the electrochemical reactions occur in the catalyst electrode layers.

The gas diffusion layers (GDLs) 200 are stacked on the two opposite sides of the membrane electrode assembly 300 and serve to uniformly distribute the reactant gases and transfer the produced electrical energy.

The gas diffusion layer 200 may have various structures capable of diffusing the reactant gas. For example, the gas diffusion layer 200 may have a porous structure having pores each having a predetermined size.

The sizes of the pores and the material of the gas diffusion layer 200 may be variously changed in accordance with required conditions and design specifications, and the present disclosure is not limited or restricted by the sizes of the pores and the material of the gas diffusion layer 200.

The separators 100 are provided to serve not only to block (separate) hydrogen and air, which are the reactant gases, but also to ensure flow paths of the reactant gases and the coolant and transmit electric current to an external circuit.

In addition, the separators 100 may also serve to distribute heat, which is generated in the fuel cell (unit cell), to the entire fuel cell, and the excessively generated heat may be discharged to the outside by a coolant flowing along the cooling channels between the separators 100.

In the exemplary embodiment of the present disclosure, the separators 100 may be defined as including both an anode separator having flow paths for hydrogen which is fuel, and a cathode separator having flow paths for air which is an oxidant.

For reference, hydrogen, which is the fuel, and air, which is the oxidant, are supplied to an anode (not illustrated) and a cathode (not illustrated) of the membrane electrode assembly 300, respectively, through the channels in the separators 100 (the cathode separator and the anode separator). The hydrogen may be supplied to the anode, and the air may be supplied to the cathode.

The hydrogen supplied to the anode is separated into hydrogen ions (protons) and electrons by catalysts in the electrode layers respectively provided on the two opposite sides of the electrolyte membrane. Only the hydrogen ions are selectively transmitted to the cathode through the electrolyte membrane, which is a cation exchange membrane, and at the same time, the electrons are transmitted to the cathode through the gas diffusion layer 200 and the separator 100 which are conductors.

At the cathode, the hydrogen ions supplied through the electrolyte membrane and the electrons transmitted through the separator 100 meet oxygen in the air supplied to the cathode by an air supply device, thereby creating a reaction of producing water. As a result of the movement of the hydrogen ions, the electrons flow through external conductive wires, and the electric current is generated as a result of the flow of the electrons.

The separators 100 are configured to supply the first reactant gas (e.g., hydrogen) and the second reactant gas (e.g., air) to the membrane electrode assembly 300, and disposed to be in close contact with one side and the other side of the membrane electrode assembly 300 (an outer surface of the gas diffusion layer) in a direction in which the fuel cells are stacked.

More specifically, the separator 100 includes: the plate body 110 stacked on the gas diffusion layer 200 and including the flow path part 101 configured to define the reaction region configured to react with the membrane electrode assembly 300, and the manifold parts 102 spaced apart from the flow path part 101; the through-holes 112 formed in the plate body 110 and configured to guide the target fluids having passed through the manifold parts 102 to the flow path parts 101; and the hole caps 120 disposed on one surface of the plate body 110 facing the gas diffusion layer 200 and configured to at least partially cover the through-holes 112, the hole caps 120 being configured to define the movement paths 120a through which the target fluids move.

The plate body 110 may be provided in the form of a flat, thin film plate, and the present disclosure is not limited or restricted by the size, material, and structure of the plate body 110.

For example, the plate body 110 may be provided in the form of an approximately flat quadrangular plate and made of a typical metal material (e.g., stainless steel, Inconel, or aluminum). According to another embodiment of the present disclosure, the plate body may be made of another material such as graphite or a carbon composite.

The flow path part 101 is disposed at an approximately central portion of the plate body 110 and faces one surface of the membrane electrode assembly 300 to define the reaction region. The flow path part 101 may include a plurality of flow paths (channels, not illustrated) disposed to be spaced apart from one another. The present disclosure is not restricted or limited by the number of flow paths and the arrangement structure of the flow paths.

The manifold parts 102 (e.g., a hydrogen manifold, a coolant manifold, and an air manifold) are penetratively provided at two opposite ends of the separator 100 with the flow path part 101 interposed therebetween, and the manifold parts 102 serve to move (supply and discharge) the hydrogen, the air, and the coolant, respectively.

For example, a first manifold (not illustrated) may be disposed at one end of the separator 100 and spaced apart from one end of the flow path part 101, and a second manifold (not illustrated) may be disposed at the other end of the separator 100 and spaced apart from the other end of the flow path part 101.

In particular, the target fluids (e.g., the reactant gases and the coolant) may be introduced into any one of the first manifold and the second manifold, and the target fluids may be discharged from the other of the first manifold and the second manifold.

For example, the first manifold may include a hydrogen inlet manifold through which the hydrogen is supplied, a coolant inlet manifold through which the coolant is supplied, and an air outlet manifold through which the air is discharged. In addition, the second manifold may include a hydrogen outlet manifold through which the hydrogen is discharged, a coolant outlet manifold through which the coolant is discharged, and an air inlet manifold through which the air is supplied.

The manifold part 102 may be variously changed in structure and shape in accordance with required conditions and design specifications. The present disclosure is not restricted or limited by the structure and shape of the manifold part 102.

For example, the hydrogen inlet manifold, the coolant inlet manifold, and the air outlet manifold may each be penetratively provided at one end of the separator 100 and have an approximately trapezoidal or triangular shape. Likewise, the hydrogen outlet manifold, the coolant outlet manifold, and the air inlet manifold may each be penetratively provided at the other end of the separator 100 and have an approximately trapezoidal or triangular shape.

In addition, the through-holes 112 are provided in the plate body 110 and positioned between the manifold parts 102 and the flow path part 101.

The through-hole 112 is penetratively provided in the plate body 110 and guides the target fluid having passed through the manifold part 102 to the flow path part 101.

For example, the reactant gas (e.g., hydrogen) supplied through the manifold part 102 (e.g., the hydrogen inlet manifold) may be supplied to the through-holes 112 along a movement route (not illustrated) defined on one surface (e.g., a bottom surface based on FIG. 2) of the separator 100. The reactant gas having passed through the through-holes 112 may be supplied to the flow path part 101 along distribution channels 132 defined on the other surface (e.g., a top surface based on FIG. 2) of the separator 100.

The through-hole 112 may have various shape in accordance with required conditions and design specifications. The present disclosure is not restricted or limited by the structure and shape of the through-hole 112.

For example, the through hole 112 may be provided in the form of a long hole with a length longer than a width thereof. Alternatively, the through-hole 112 may have a circular or other shapes.

According to the exemplary embodiment of the present disclosure, the fuel cell stack 10 may include a sealing member 130 disposed on the plate body 110 and configured to seal portions between the adjacent through-holes 112 and define the distribution channels 132 configured to connect the flow path part 101 and the through-holes 112 so that the flow path part 101 and the through-holes 112 communicate with one another.

The sealing member 130 may be disposed on the plate body 110 and configured to seal the portions between the adjacent through-holes 112 while sealing the portions between the membrane electrode assembly 300 and the separator 100. The plurality of distribution channels 132 may be defined between the membrane electrode assembly 300 and the separator 100 by means of the sealing member 130 and connect the flow path part 101 and the through-holes 112 so that the flow path part 101 and the through-holes 112 communicate with one another. Further, the hole caps 120 may be positioned in the distribution channels 132.

The plurality of distribution channels 132 is spaced apart from the through-holes 112, respectively, at predetermined intervals. One end of each of the distribution channels 132 communicates with the manifold part 102 through the through-hole 112, the other end of each of the distribution channel 132 communicates with the flow path part 101.

The distribution channel 132 may be variously changed in number, width, and spacing interval in accordance with required conditions and design specifications. The present disclosure is not restricted or limited by the number of distribution channels 132, the width of the distribution channel 132, and the spacing interval between the distribution channels 132.

The sealing member 130 may be manufactured in various ways in accordance with required conditions and design specifications, and the present disclosure is not restricted or limited by the method of manufacturing the sealing member 130.

For example, the sealing member 130 may be manufactured by applying or transferring a sealant made of an elastic material such as rubber, silicone, or urethane onto the surface of the plate body 110 or performing a printing process on the surface of the plated body 110 with the sealant.

According to another embodiment of the present disclosure, the sealing member may be attached to the plate body by injection molding. Alternatively, the sealing member may be manufactured (by injection molding, for example) separately from the plate body and then attached (bonded) to the plate body.

Figure 2:
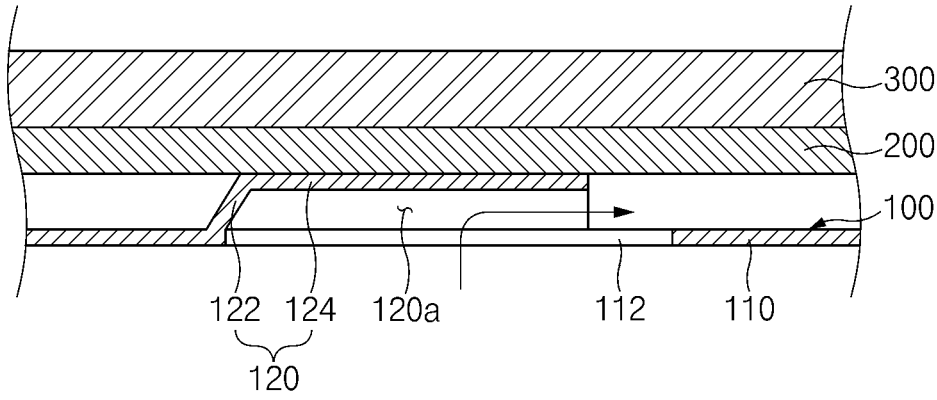
FIG. 2 is a cross-sectional view for explaining the fuel cell stack according to the embodiment of the present disclosure.
Figure 3:
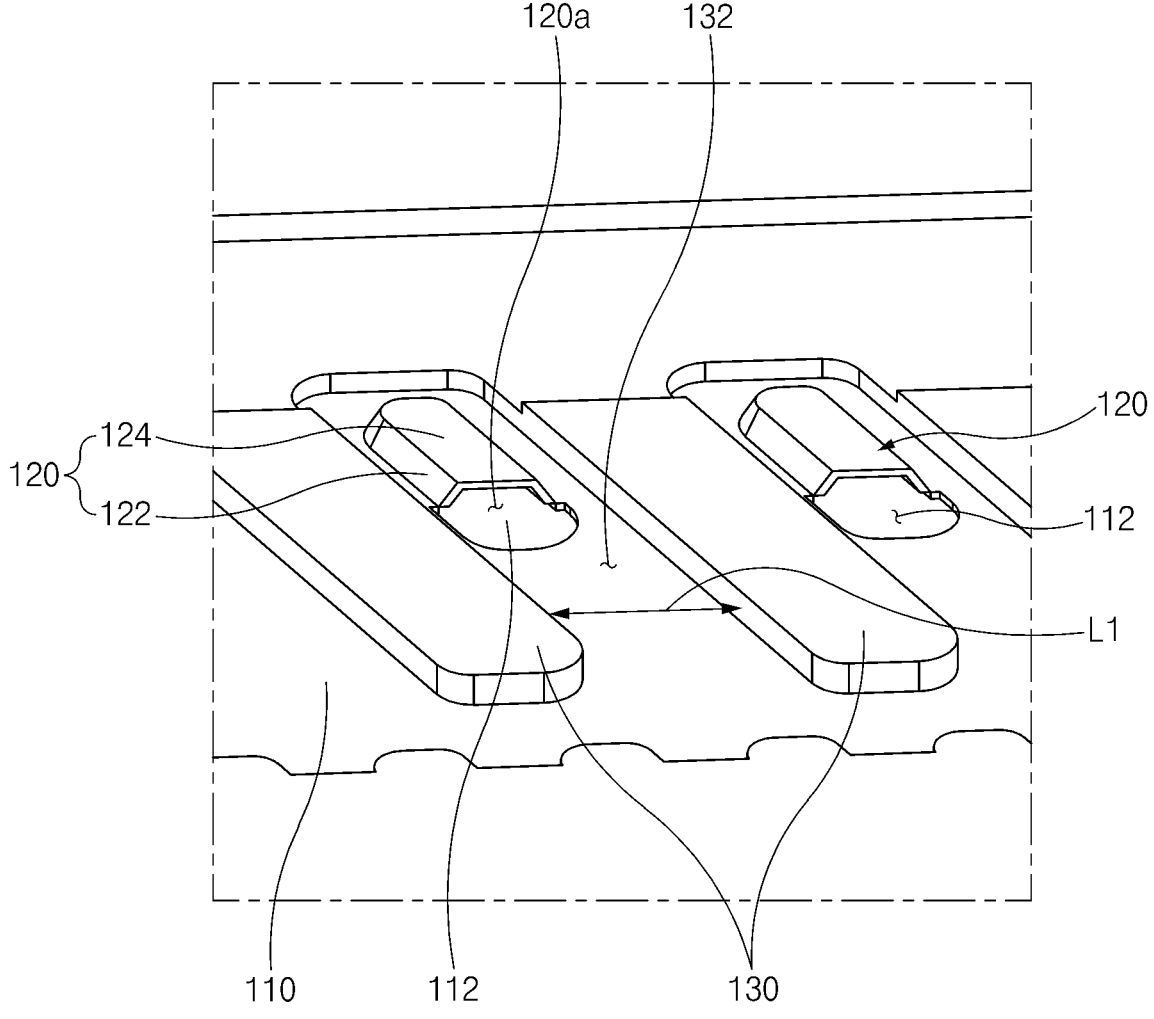
FIGS. 3 and 4 are views for explaining a separator of the fuel cell stack according to the embodiment of the present disclosure.
Figure 4:
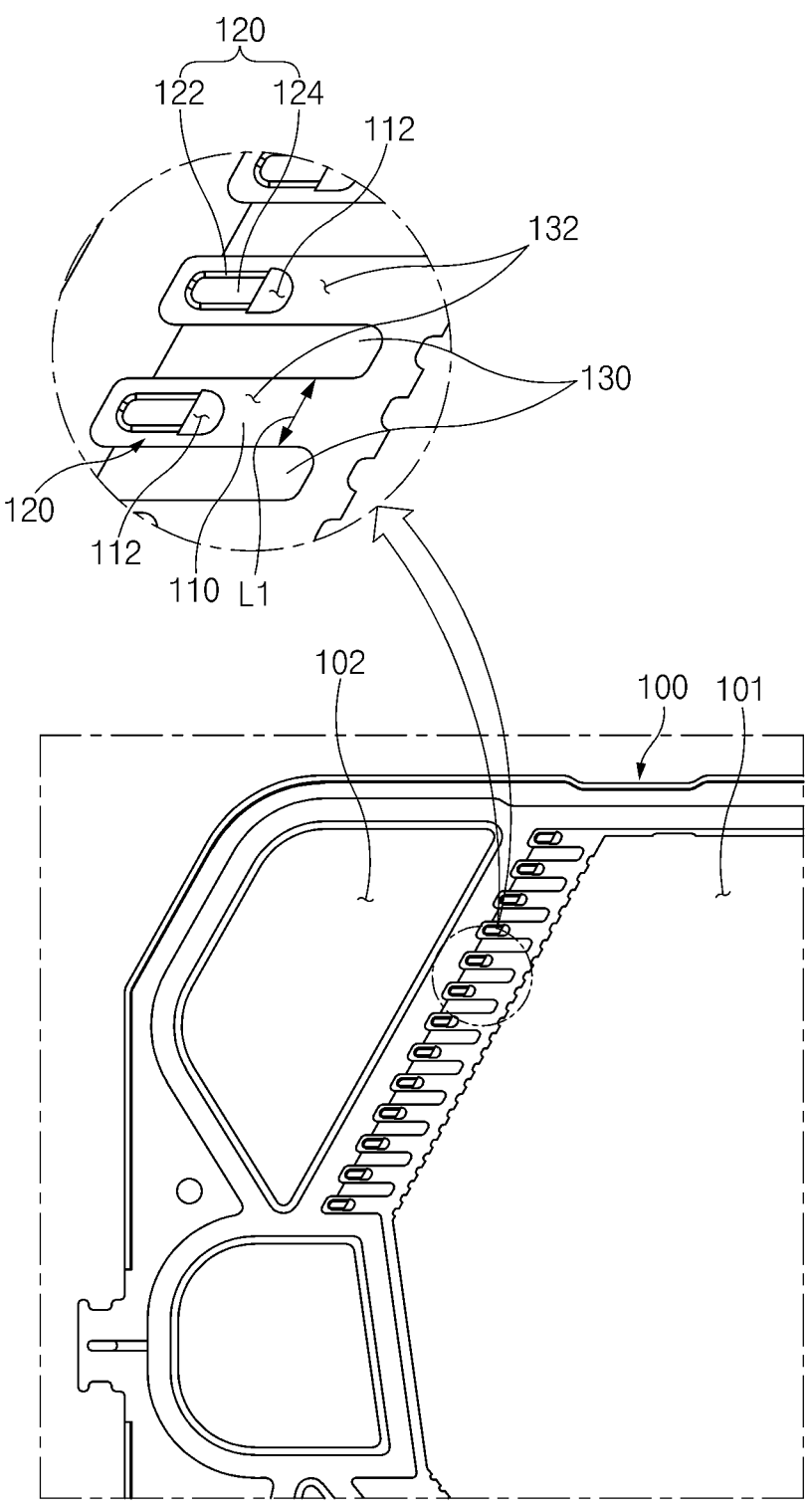

Referring to FIGS. 2 to 4, the hole cap 120 is provided on one surface of the plate body 110 facing the gas diffusion layer 200 and covers at least a part of the through-hole 112. The movement path 120a through which the target fluid (the reactant gas or the coolant) moves is defined between the gas diffusion layer 200 and the plate body 110 by means of the hole cap 120.

The hole cap 120 serves to stably ensure fluidity and flow efficiency of the target fluid passing through the through-hole 112.

That is, in the related art, the entire through-hole is covered by the gas diffusion layer (the gas diffusion layer is inserted into the through-hole to block the through-hole) in the state in which the separator is stacked on the gas diffusion layer, and the reactant gas introduced into the through-hole needs to flow to the reaction region while inevitably passing through the compressed gas diffusion layer. For this reason, there is a problem in that fluidity and flow efficiency of the target fluid deteriorate.

Moreover, in the related art, when fastening pressure is applied to the fuel stack in the state in which the separator is stacked on the gas diffusion layer, the portion of the sealing member, which is disposed around the through-hole, is excessively compressed, and thus a width (see L1 in FIG. 3) of the distribution channel decreases, which makes it difficult to ensure sufficient flow paths (flow path cross-sectional areas) of the target fluids (the reactant gas and the coolant). For this reason, there is a problem in that it is difficult to smoothly supply the target fluid to the reaction region of the separator (plate body).

However, according to the embodiment of the present disclosure, the hole cap 120 may cover the through-hole 112, and the hole cap 120 may define the movement path 120a which is not blocked by the gas diffusion layer 200. Therefore, it is possible to ensure the fluidity and flow efficiency of the reactant gas (or coolant) passing through the through-hole 112 and ensure stable output performance of the fuel cell stack 10.

Moreover, according to the embodiment of the present disclosure, the hole cap 120 may inhibit the portion of the sealing member 130, which is disposed around the through-hole 112, from being excessively compressed at the time of applying the fastening pressure to the fuel cell stack 10 (the hole cap 120 may maintain a width of the distribution channel while supporting the sealing member 130 which is compressed to a certain level or higher). Therefore, it is possible to obtain an advantageous effect of ensuring sealability of the fuel cell and ensuring sufficient flow paths (flow path cross-sectional areas) for the reactant gases and the coolant. Therefore, it is possible to obtain an advantageous effect of minimizing a deviation between flow rates of the target fluids supplied to the flow paths of the flow path part 101 and ensuring stable and uniform output performance of the fuel cell stack 10.

The hole cap 120 may have various structures having the movement path 120a. The present disclosure is not restricted or limited by the structure and shape of the hole cap 120.

According to the exemplary embodiment of the present disclosure, the hole cap 120 may include a side cap portion 122 provided on an edge of the through-hole 112, and a top cap portion 124 spaced apart from the plate body 110, configured to cover the through-hole 112, and supported by the side cap portion 122. The movement path 120a may be defined in a space between the top cap portion 124 and the plate body 110.

For reference, in the embodiment of the present disclosure, the movement path 120a may be understood as a vacant space defined in the hole cap 120.

The movement path 120a may have various structures in accordance with required conditions and design specifications. According to the exemplary embodiment of the present disclosure, the movement path 120a may be defined to be approximately parallel to the plate body 110. According to another embodiment of the present disclosure, the movement path may have a curved shape or other shapes.

The side cap portion 122 may have various structures having an opening portion that communicates with the flow path part 101 (the distribution channel).

According to the exemplary embodiment of the present disclosure, the side cap portion 122 may be continuously provided along the edge of the through-hole 112. For example, the side cap portion 122 may be provided in a continuous "C" shape along the edge of the through-hole 112.

In the embodiment of the present disclosure illustrated and described above, the example has been described in which the side cap portion 122 is provided in the form of a continuous band. However, according to another embodiment of the present disclosure, a plurality of side cap portions may be provided to be spaced apart from one another along the edge of the through-hole.

The top cap portion 124 is supported on an end of the side cap portion 122 so as to be spaced apart from the plate body 110. The top cap portion 124 and the side cap portion 122 collectively define the movement path 120a.

For example, the top cap portion 124 may be provided in the form of an approximately flat plate. The top cap portion 124 and the side cap portion 122 may collectively define an approximately "U" cross-sectional shape.

The gas diffusion layer 200 may be supported on an outer surface (top surface based on FIG. 2) of the top cap portion 124. The target fluid having passed through the through-hole 112 may move along the internal space (movement path) of the top cap portion 124.

The top cap portion 124 may be variously changed in size in accordance with required conditions and design specifications. The present disclosure is not restricted or limited by the size of the top cap portion 124.

In particular, the top cap portion 124 may have a size (an area being in contact with the gas diffusion layer) corresponding to 50% or more of an overall area of the through-hole 112.

According to another embodiment of the present disclosure, the top cap portion 124 may have a size corresponding to less than 50% (e.g., 25%) of the overall area of the through-hole 112. However, if the size of the top cap portion 124 is less than 50% of the overall area of the through-hole 112, it is difficult to effectively support the portion of the sealing member 130 disposed around the through-hole 112 (it is difficult to inhibit the sealing member from being excessively compressed). Therefore, the top cap portion 124 may have a size corresponding to 50% or more of the overall area of the through-hole 112.

The hole cap 120 may be provided in various ways in accordance with required conditions and design specifications.

According to the exemplary embodiment of the present disclosure, the hole cap 120 may be integrated with the plate body 110 by partially processing (e.g., pressing) a part of the plate body 110.

In particular, the hole cap 120 may be formed together with the flow path (through a single process) when the flow path (channel) is formed by partially processing a part of the plate body 110.

As described above, according to the embodiment of the present disclosure, the hole cap 120 may be formed at the time of forming separator 100 (e.g., during the process of forming the flow path). Therefore, it is possible to obtain an advantageous effect of simplifying the structure and manufacturing process and reducing the costs.

Figure 5:
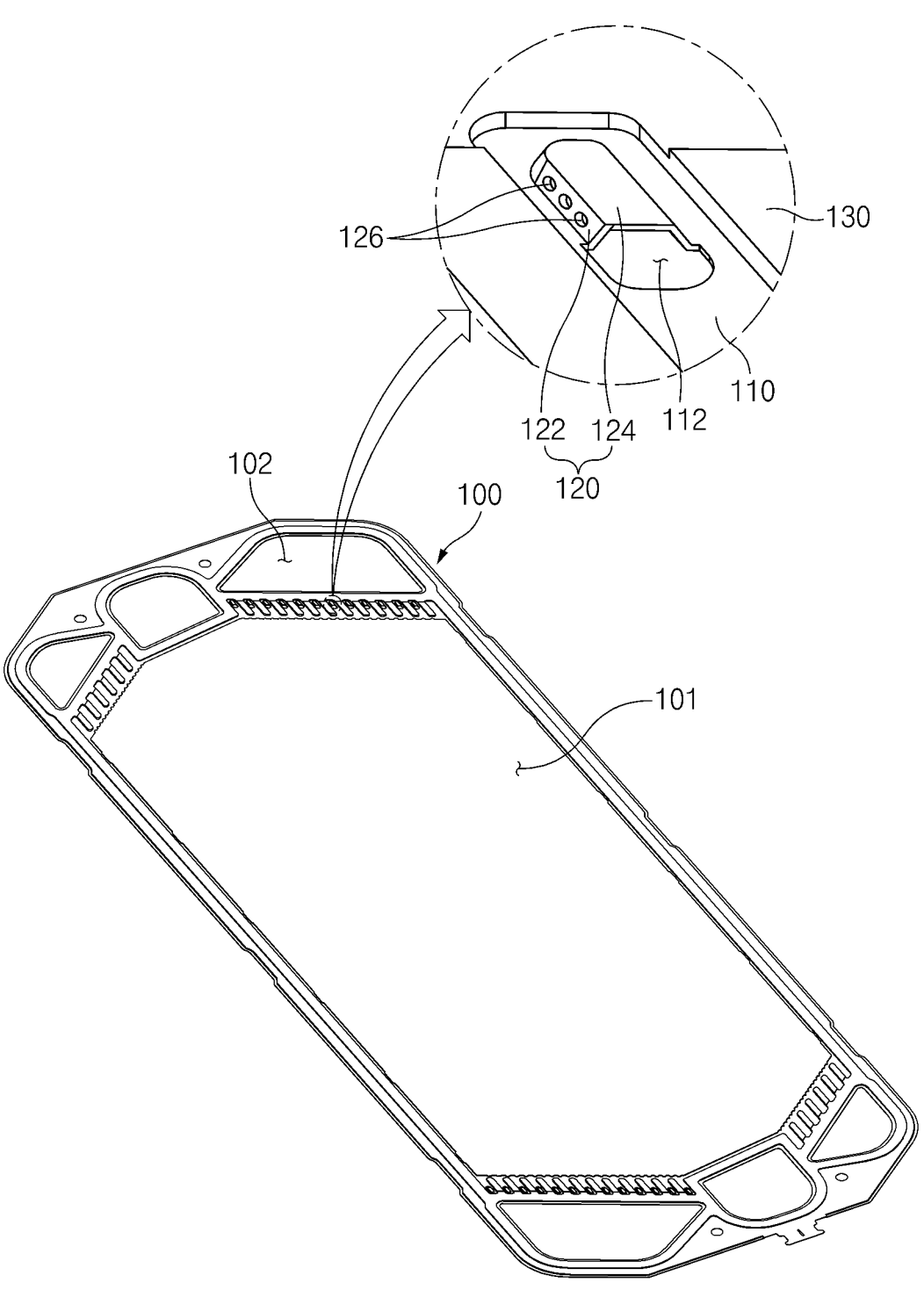
FIGS. 5 and 6 are views for explaining side holes of the fuel cell stack according to the embodiment of the present disclosure.
Figure 6:
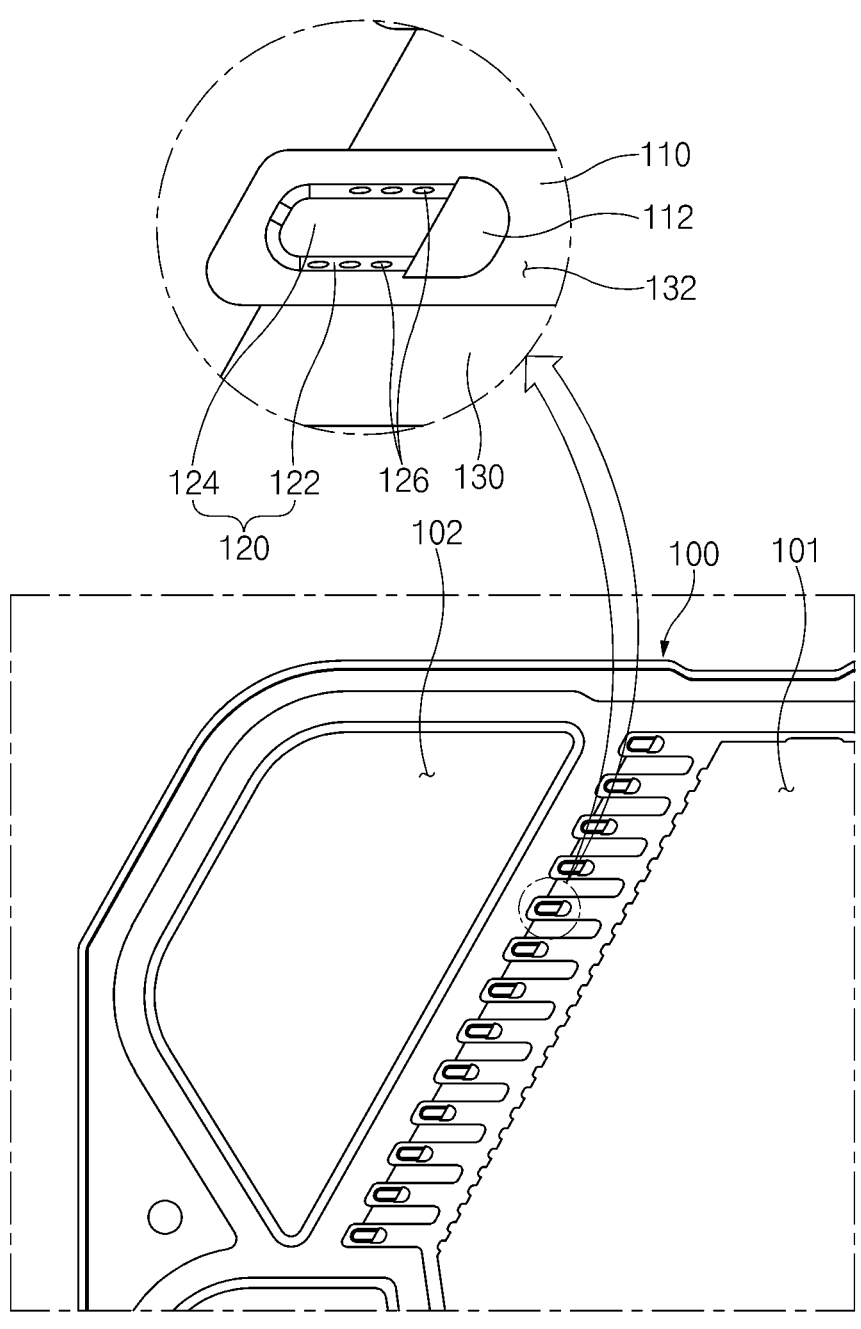

Referring to FIGS. 5 and 6, according to the exemplary embodiment of the present disclosure, the fuel cell stack 10 may include side holes 126 penetratively formed in a wall surface of the side cap portion 122.

The side hole 126 may have various structures in accordance with required conditions and design specifications. The present disclosure is not restricted or limited by the structure of the side hole 126.

For example, the side hole 126 may be provided in the form of an approximately circular hole. The side hole 126 may be provided in plural, and the plurality of side holes 126 may be spaced apart from one another at predetermined intervals. In particular, the plurality of side holes 126 may be formed in a first wall surface of the side cap portion 122 and spaced apart from one another at predetermined intervals, and the plurality of side holes 126 may be spaced apart from one another at predetermined intervals and formed in a second wall surface of the side cap portion 122 that faces the first wall surface. According to another embodiment of the present disclosure, only the single side hole may be formed in the wall surface of the side cap portion. Alternatively, the side hole may be provided in the form of an approximately long hole having a long length.

With the above-mentioned structure, the target fluid having passed through the through-hole 112 may be supplied to the flow path part 101 along the movement path 120a or additionally supplied to the flow path part 101 while bypassing the movement path 120a through the side hole 126.

As described above, according to the embodiment of the present disclosure, the side hole 126 may be provided in side cap portion. Therefore, it is possible to obtain an advantageous effect of ensuring a smoother flow of the target fluid passing through the through-hole 112 and reducing the occurrence of differential pressure in the through-hole 112.

Figure 7:
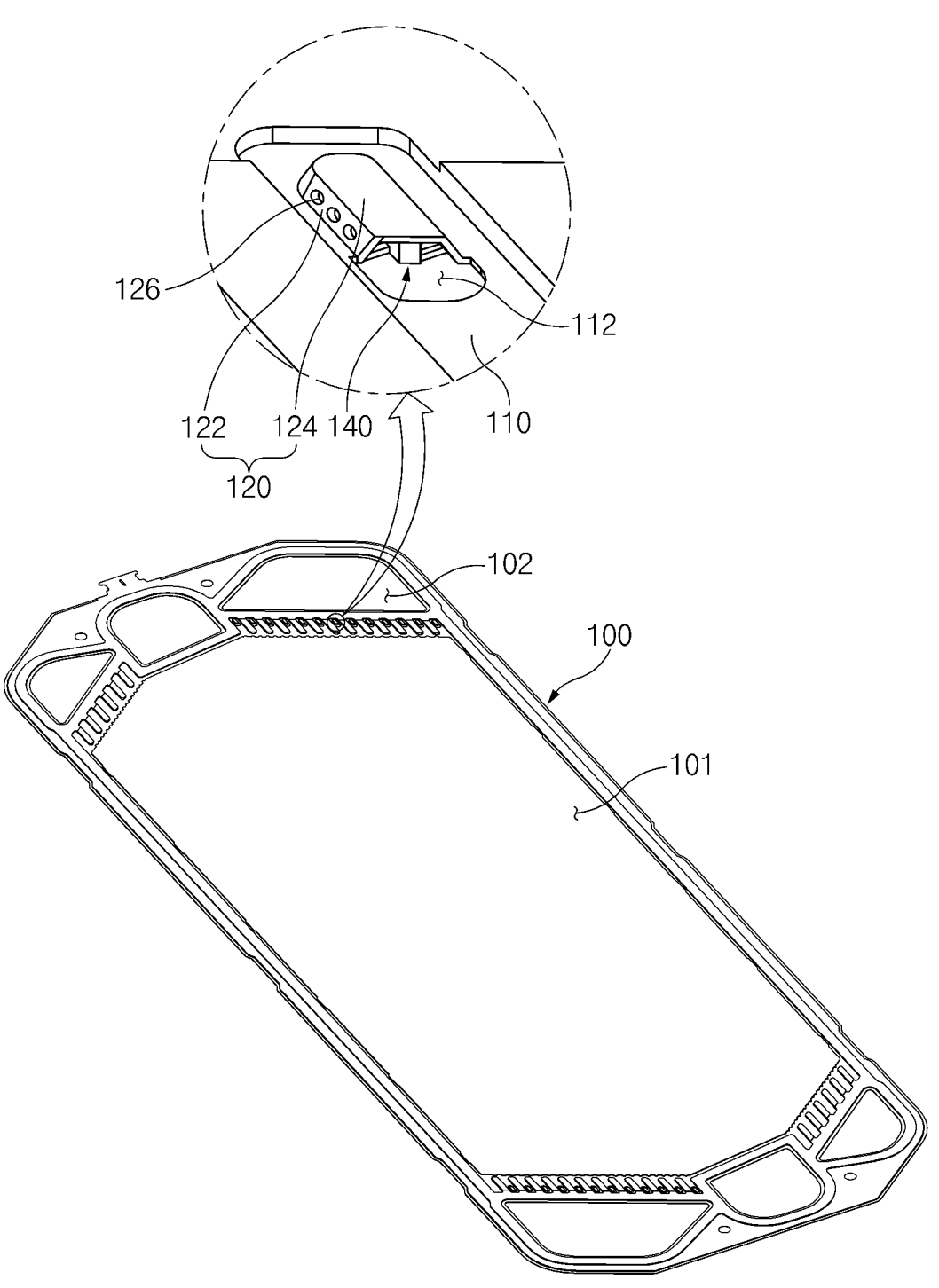
FIGS. 7, 8, and 9 are views for explaining a reinforcing part of the fuel cell stack according to the embodiment of the present disclosure.
Figure 8:
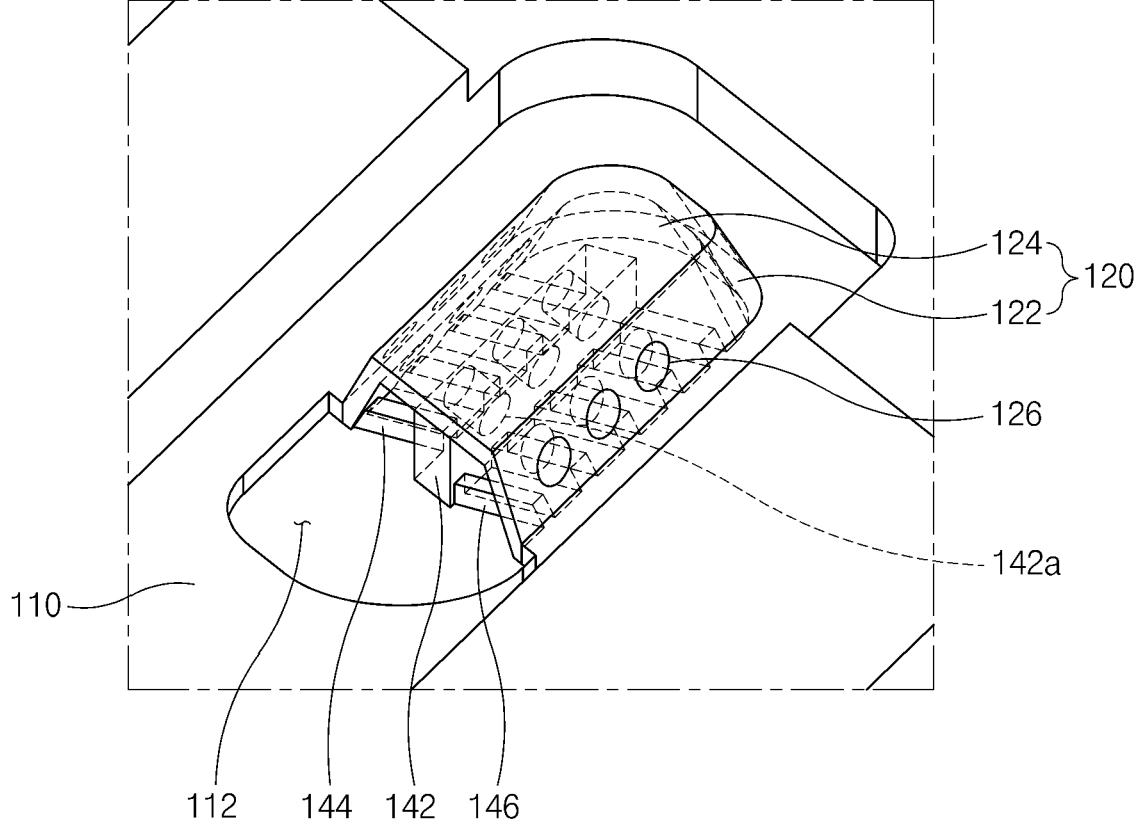
Figure 9:
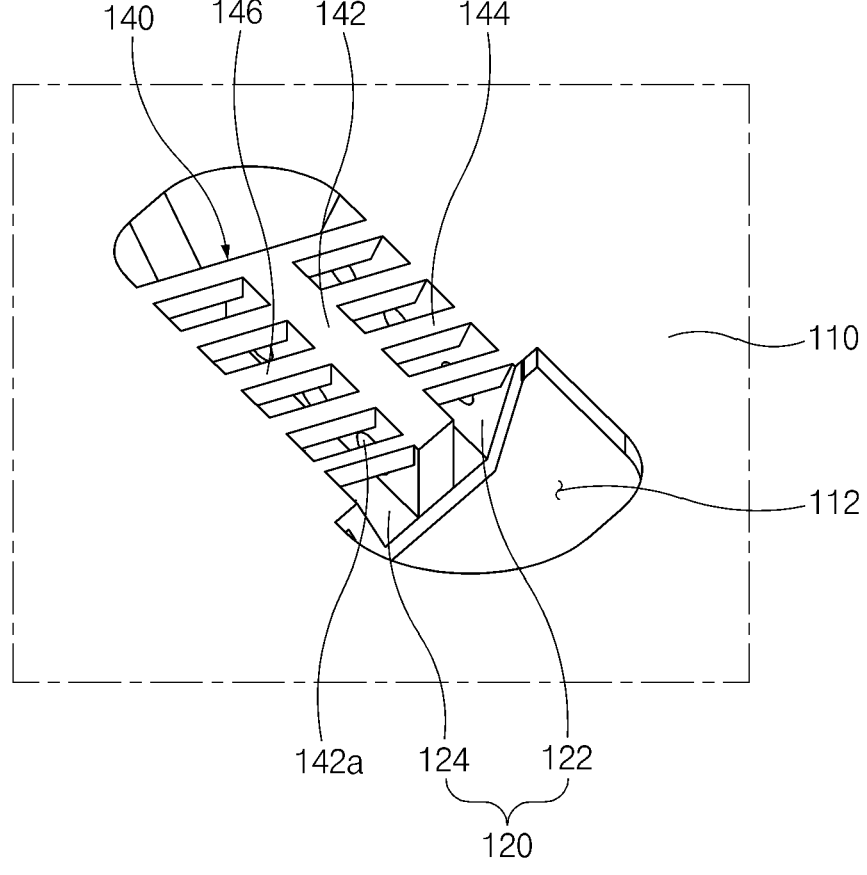

Referring to FIGS. 7 to 9, according to the exemplary embodiment of the present disclosure, the fuel cell stack 10 may include a reinforcing part 140 configured to support the hole cap 120 on the plate body 110.

The reinforcing part 140 serves to prevent the hole cap 120 from collapsing and to maintain the shape of the hole cap 120 (ensure the movement path) when the fastening pressure is applied to the fuel cell stack 10.

The reinforcing part 140 may have various structures capable of supporting the hole cap 120 on the plate body 110. The present disclosure is not restricted or limited by the structure of the reinforcing part 140.

For example, the reinforcing part 140 may be provided in the through-hole 112. According to another embodiment of the present disclosure, the reinforcing part may be provided outside the through-hole (e.g., on the outer surface of the side cap portion).

According to the exemplary embodiment of the present disclosure, the reinforcing part 140 may include: a center reinforcing member 142 connected to an inner surface of the top cap portion 124; first side reinforcing members 144 each having one end connected to one side surface of the center reinforcing member 142 and the other end connected to the plate body 110; and second side reinforcing members 146 each having one end connected to the other side surface of the center reinforcing member 142 and the other end connected to the plate body 110.

The center reinforcing member 142 may have various structures capable of supporting the inner surface of the top cap portion 124. For example, the center reinforcing member 142 may have an approximately straight shape and be disposed on a central portion of the inner surface of the top cap portion 124.

The first side reinforcing member 144 and the second side reinforcing member 146 serve to support the center reinforcing member 142 on the plate body 110.

In particular, the first side reinforcing member 144 may be provided in plural, and the plurality of first side reinforcing members 144 may be spaced apart from one another in a longitudinal direction of the center reinforcing member 142. The second side reinforcing member 146 may be provided in plural, and the plurality of second side reinforcing members 146 may be spaced apart from one another in the longitudinal direction of the center reinforcing member 142. The first side reinforcing members 144, the second side reinforcing members 146, and the center reinforcing member 142 may collectively define an approximately fish-bone shape.

As described above, according to the embodiment of the present disclosure, the plurality of first side reinforcing members 144 and the plurality of second side reinforcing members 146 may be spaced apart from one another in the longitudinal direction of the center reinforcing member 142. Therefore, it is possible to ensure a smooth flow of the target fluid while more stably supporting the center reinforcing member 142.

In addition, according to the exemplary embodiment of the present disclosure, the fuel cell stack 10 may include center holes 142a provided in the center reinforcing member 142 and formed through one side surface and the other side surface of the center reinforcing member 142.

For example, the center hole 142a may be provided in plural, and the plurality of center holes 142a may be provided in the center reinforcing member 142 and spaced apart from one another at predetermined intervals. The number of center holes 142a and the spacing intervals between the center holes 142a may be variously changed in accordance with required conditions and design specifications.

As described above, according to the embodiment of the present disclosure, the center hole 142a may be provided in the center reinforcing member 142. Therefore, it is possible to obtain an advantageous effect of minimizing a decrease in flow of the target fluid caused by the center reinforcing member 142 provided in the hole cap 120.

According to the embodiment of the present disclosure described above, it is possible to obtain an advantageous effect of ensuring the smooth flows of the reactant gases and the smooth flow of the coolant and improving the safety and reliability.

In particular, according to the embodiment of the present disclosure, it is possible to obtain an advantageous effect of improving flow efficiency and enabling the reactant gases and the coolant to stably flow through the through-holes for guiding the reactant gases and the coolant introduced through the manifold flow paths of the separator to the reaction region.

In addition, according to the embodiment of the present disclosure, it is possible to obtain an advantageous effect of inhibiting the sealing member from being excessively compressed (being deformed) and stably ensuring the flow path areas through which the reactant gases and the coolant having passed through through-holes flow.

In addition, according to the embodiment of the present disclosure, it is possible to obtain an advantageous effect of ensuring sealability (fastening performance) between the fuel cells while ensuring the flows of the reactant gases and the flow of the coolant.

In addition, according to the embodiment of the present disclosure, it is possible to obtain an advantageous effect of simplifying the structure and the manufacturing process and reducing the manufacturing costs.

In addition, according to the embodiment of the present disclosure, it is possible to obtain an advantageous effect of minimizing the distribution deviation (flow rate deviation) of the reactant gas and ensuring the stable output performance of the fuel cell.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A separator for a fuel cell, which is configured to be stacked on a gas diffusion layer provided on a membrane electrode assembly (MEA), the separator comprising:

a plate body configured to be stacked on the gas diffusion layer and comprising a flow path part configured to define a reaction region configured to react with the membrane electrode assembly, and manifold parts spaced apart from the flow path part;

through-holes disposed in the plate body and configured to guide target fluids that have passed through the manifold parts to the flow path part; and hole caps disposed on one surface of the plate body that faces the gas diffusion layer and configured to at least partially cover the through-holes, the hole caps being configured to define movement paths through which the target fluids move, wherein each hole cap comprises:

a side cap portion disposed on an edge of the respective through-holes; and a top cap portion spaced apart from the plate body, configured to cover the respective through-holes, and supported by the side cap portion, and wherein the movement paths are defined in a space between the top cap portion and the plate body, wherein each hole cap further comprises:

a side hole that penetrates a wall surface of the side cap portion to ensure smoother flow of the target fluids and reduce occurrence of differential pressure in the through-holes; and reinforcing parts configured to support the hole caps on the plate body, wherein each reinforcing part comprises:

a center reinforcing member connected to an inner surface of the top cap portion;

a first side reinforcing member having a first end connected to a first side surface of the center reinforcing member and a second end connected to the plate body; and a second side reinforcing member having a first end connected to a second side surface of the center reinforcing member and a second end connected to the plate body.

2. The separator of claim 1, wherein the side cap portion is continuously disposed along the edge of the respective through-holes.

3. The separator of claim 1, wherein the reinforcing part is disposed in the respective through-holes.

4. The separator of claim 1, wherein each reinforcing part further comprises a plurality of first side reinforcing members spaced apart from one another in a longitudinal direction of the center reinforcing member, and a plurality of second side reinforcing members spaced apart from one another in the longitudinal direction of the center reinforcing member.

5. The separator of claim 1, wherein each reinforcing part further comprises:

a center hole disposed in the center reinforcing member through the first side surface and the second side surface of the center reinforcing member.

6. The separator of claim 1, wherein the movement paths are parallel to the plate body.

7. The separator of claim 1, comprising:

a sealing member disposed on the plate body and configured to seal portions between adjacent through-holes, the sealing member being configured to define distribution channels configured to connect the flow path part and the through-holes so that the flow path part and the through-holes communicate with each other, wherein the hole caps are positioned in the respective distribution channels.

8. The separator of claim 1, wherein each hole cap is integrated with the plate body by partially processing a part of the plate body.

9. A fuel cell stack comprising:

a membrane electrode assembly (MEA);

a gas diffusion layer stacked on the membrane electrode assembly; and a separator comprising:

a plate body configured to be stacked on the gas diffusion layer and comprising a flow path part configured to define a reaction region configured to react with the membrane electrode assembly, and manifold parts spaced apart from the flow path part;

through-holes disposed in the plate body and configured to guide target fluids that have passed through the manifold parts to the reaction region; and hole caps disposed on one surface of the plate body that faces the gas diffusion layer and configured to at least partially cover the through-holes, the hole caps being configured to define movement paths through which the target fluids move, wherein each hole cap comprises:

a side cap portion disposed on an edge of the respective through-holes; and a top cap portion spaced apart from the plate body, configured to cover the respective through-holes, and supported by the side cap portion, and wherein the movement paths are defined in a space between the top cap portion and the plate body, and wherein each hole cap further comprises:

a side hole that penetrates a wall surface of the side cap portion to ensure smoother flow of the target fluids and reduce occurrence of differential pressure in the through-holes; and reinforcing parts configured to support the hole caps on the plate body, wherein each reinforcing part comprises:

a center reinforcing member connected to an inner surface of the top cap portion;

a first side reinforcing member having a first end connected to a first side surface of the center reinforcing member and a second end connected to the plate body; and a second side reinforcing member having a first end connected to a second side surface of the center reinforcing member and a second end connected to the plate body.

10. The fuel cell stack of claim 9, wherein each reinforcing part further comprises:

a center hole disposed in the center reinforcing member through the first side surface and the second side surface of the center reinforcing member.

11. The fuel cell stack of claim 9, comprising:

a sealing member disposed on the plate body and configured to seal portions between adjacent through-holes, the sealing member being configured to define distribution channels configured to connect the flow path part and the through-holes so that the flow path part and the through-holes communicate with each other, wherein the hole caps are positioned in the respective distribution channels.

12. The fuel cell stack of claim 9, wherein each hole cap is integrated with the plate body by partially processing a part of the plate body.

\*   \*   \*   \*   \*